(12) United States Patent
Fechtel

(10) Patent No.: US 7,940,848 B2
(45) Date of Patent: May 10, 2011

(54) SYSTEM HAVING AN OFDM CHANNEL ESTIMATOR

(75) Inventor: Stefan Fechtel, Zorneding (DE)

(73) Assignee: Infineon Technologies AG, Neubiberg (DE)

( * ) Notice: Subject to any disclaimer, the term of this patent is extended or adjusted under 35 U.S.C. 154(b) by 939 days.

(21) Appl. No.: 11/695,361

(22) Filed: Apr. 2, 2007

(65) Prior Publication Data
US 2008/0240265 A1   Oct. 2, 2008

(51) Int. Cl.
*H04L 27/28* (2006.01)

(52) U.S. Cl. ........................................................ 375/260

(58) Field of Classification Search .................. 375/260, 375/220, 316, 354, 346, 347, 349; 370/329, 370/330, 342
See application file for complete search history.

(56) References Cited

U.S. PATENT DOCUMENTS

| | | | |
|---|---|---|---|
| 6,775,340 B1 * | 8/2004 | Arslan et al. | 375/354 |
| 2004/0234013 A1 * | 11/2004 | Li et al. | 375/347 |
| 2006/0209973 A1 * | 9/2006 | Gorokhov et al. | 375/260 |
| 2008/0130732 A1 * | 6/2008 | Kent et al. | 375/232 |
| 2008/0170608 A1 * | 7/2008 | Guey | 375/220 |

OTHER PUBLICATIONS

"ETSI EN 300 744 V1.4.1", European Standard (Telecommunications Series), 2000-2008, 50 pgs.
"Optimal Parametric Feedforward Estimation of Frequency-Selective Fading Radio Channels", Stefan A. Fechtel, et al., IEEE, 1994 12 pgs.
"Optimum Receiver Design for Wireless Broad-Band Systems Using OFDM-Part I", Michael Speth, et al., IEEE, 1999 10 pgs.
"Optimum Receiver Design for OFDM-Based Broadband Transmission-Part II: A Case Study", Michael Speth, et al., IEEE, 2001 8 pgs.
"Two-Dimensional Pilot-Symbol-Aided Channel Estimation by Wiener Filtering", Peter Hoeher, et al., IEEE, 1997 4 pgs.

* cited by examiner

*Primary Examiner* — Khai Tran
(74) *Attorney, Agent, or Firm* — Dicke, Billig & Czaja, PLLC

(57) ABSTRACT

A method for an operating system including a channel estimation for OFDM systems in a receiver is disclosed. One embodiment provides information indicative of multiple transmitter signals reception characteristics of signals received from multiple transmitters. Then, channel estimation is performed dependent on the information.

31 Claims, 11 Drawing Sheets

$M=2$
$P_m = T_{o,m}, T_{w,m}, T_{o,m}, T_{w,m}, T_d, F_d$

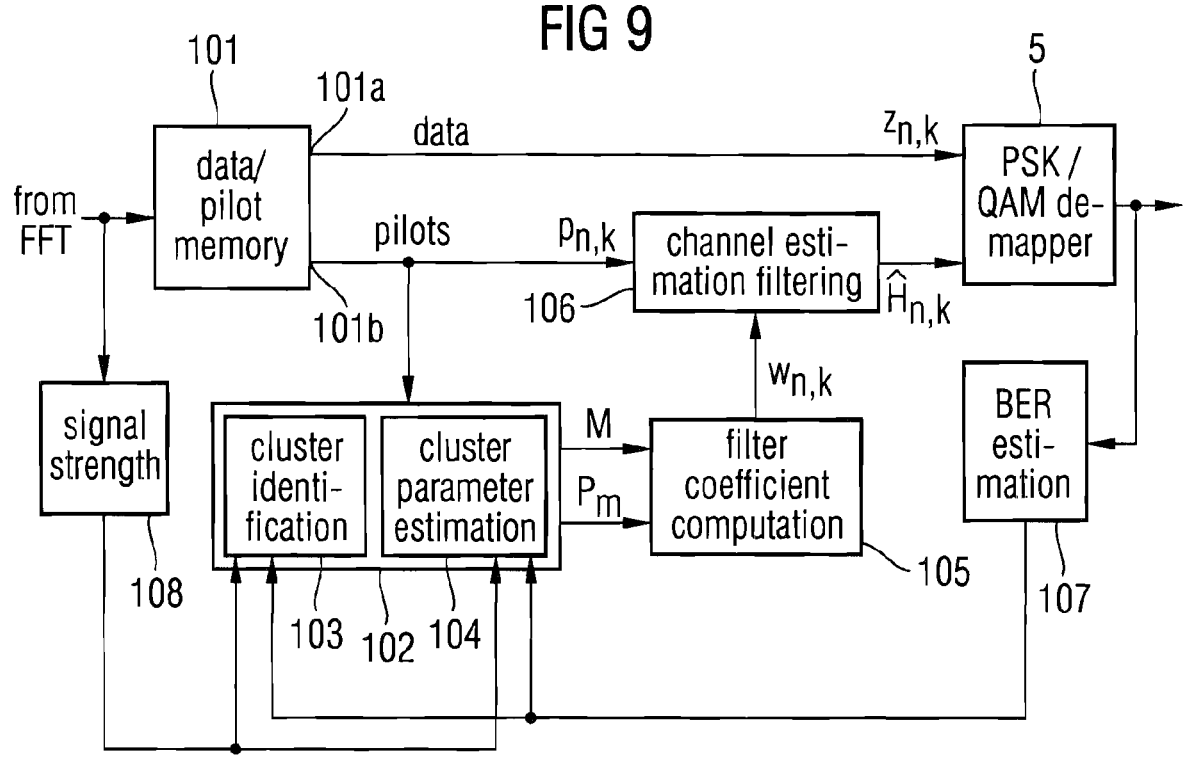
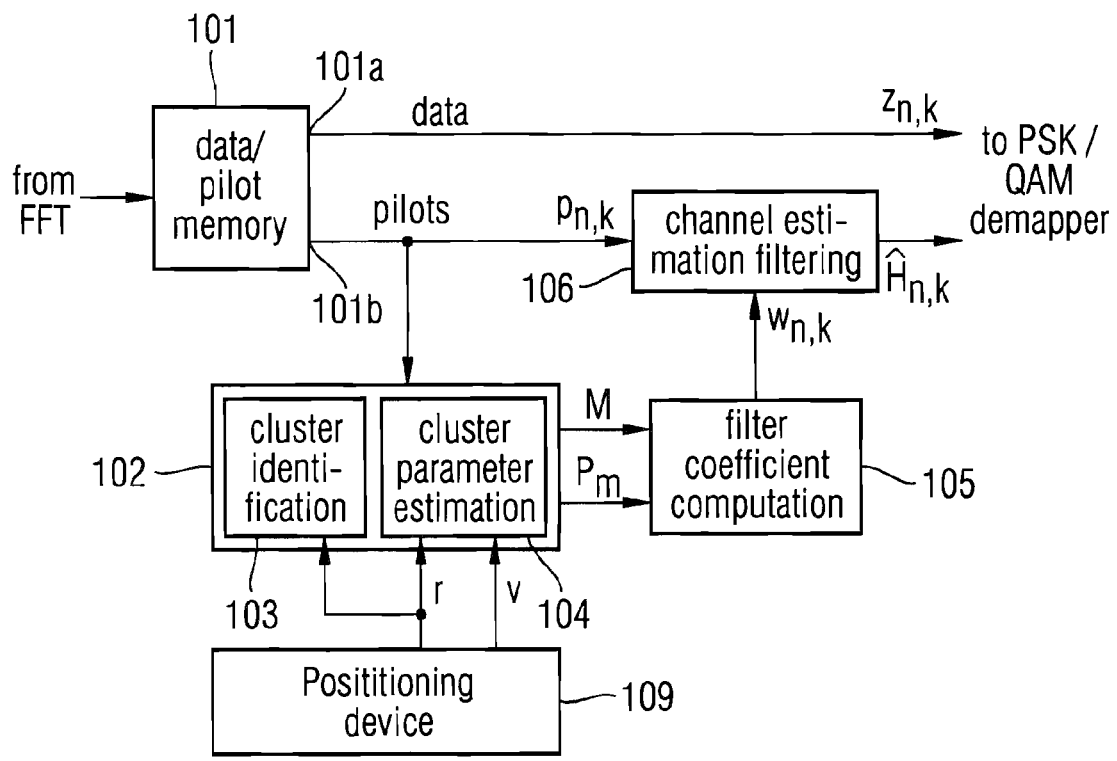

SYSTEM HAVING AN OFDM CHANNEL ESTIMATOR

BACKGROUND

The invention relates to channel estimation for orthogonal frequency division multiplexing (OFDM) systems and more particularly to channel estimation for OFDM systems having a plurality of transmitters.

OFDM multi-carrier modulation is used in many communication systems and has recently become increasingly popular because it provides a substantial reduction in equalization complexity compared to classical modulation techniques. For demodulating OFDM-modulated data in the presence of substantial time variations of the transmission channel, knowledge of the transmission channel frequency response is required. Such knowledge is obtained by channel estimation. Pilot-symbol aided channel estimation is based on periodically inserting known symbols, termed pilot symbols, in the transmitted data sequence. As in OFDM systems channel variations are in two dimensions, pilots are typically inserted in the time-frequency grid. The channel response can then be reconstructed via interpolation by exploiting the correlation of the channel in time and frequency. Interpolation in the time and frequency domain must comply with the two-dimensional sampling theorem.

The interpolation in time is bandwidth-limited by the time-variant behavior of the transmission channel. As these channel time variations are produced by the receiver's mobility (speed), pilot-based channel estimation is limited in terms of a maximum tolerable Doppler spread $F_d$. On the other hand, the interpolation in frequency is bandwidth-limited by the length of the channel impulse response (CIR) of the transmission channel, which is dependent on the multi-path propagation scenario exhibited in the transmission channel. Thus, pilot-based channel estimation is also limited in terms of a maximum tolerable multi-path delay spread $T_d$.

As conventional pilot-based channel estimation can not tolerate under-sampling of channel variations in any direction (time, frequency), the channel estimation performance degrades when high Doppler spread $F_d$ and large multi-path delay spread $T_d$ occur simultaneously. Using a "denser" pilot location pattern in the time-frequency grid would enhance the maximum tolerable Doppler spread $F_d$ and the maximum tolerable multi-path delay spread $T_d$. However, increasing the number of pilot symbols per time or frequency interval reduces the capacity of the transmission channel.

In view of the foregoing, it is desirable to provide for a high channel estimation performance over a wide variety of channel conditions.

For these and other reasons, there is a need for the present invention.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 9 is a block diagram of the channel estimator illustrated in FIG. 7 equipped with circuitry for generating information on signal reception characteristics.

FIG. 10 is a block diagram of the channel estimator illustrated in FIG. 7 equipped with another circuitry for generating information on signal reception characteristics.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

In the following, the expression OFDM is not intended to be limited to specific standards or applications but includes many communication systems including virtually all multi-carrier modulation systems. In particular, radio systems employing multiple transmit and/or receive antennas known as multiple input/multiple output (MIMO) systems can be used with OFDM (i.e. multi-carrier modulation) and may also use the techniques described herein.

Further, most of the following description refers by way of example to terrestrial/hand-held digital video broadcasting (DVB-T/H). DVB-T/H is based on terrestrial transmitters and a communication system design adapted for mobile receivers. However, also other OFDM systems as, for instance, satellite OFDM systems, may take benefit from the concepts and principles outlined herein.

Figure 1:
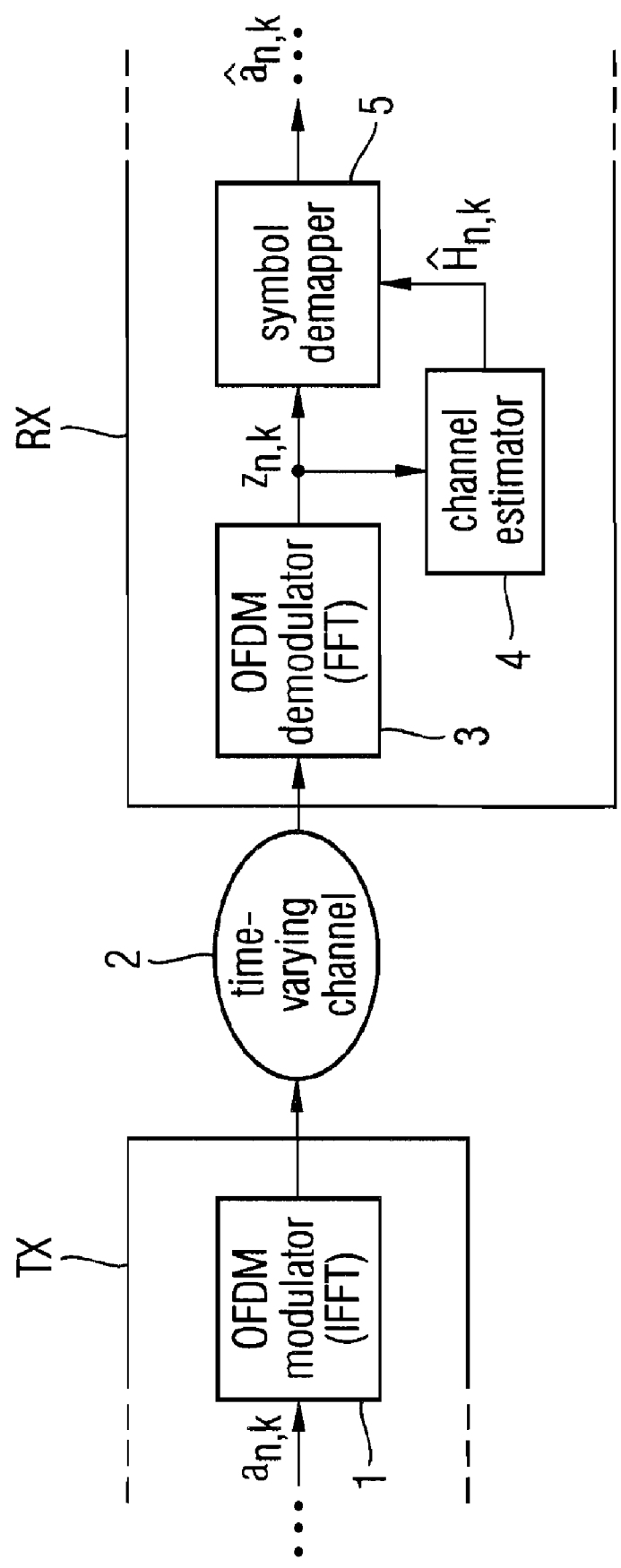
FIG. 1 illustrates a block diagram of an OFDM inner transmission system.

FIG. 1 illustrates the basic building blocks of a communication system having an inner OFDM transmission system. In a transmitter TX, information data symbols $a_{n,k}$ are mapped onto K parallel sub-carriers of consecutive OFDM symbols. OFDM modulation is accomplished by an OFDM modulator 1, which may be implemented by an inverse fast Fourier transform (IFFT) stage. n denotes the symbol time index and k denotes the sub-carrier frequency index running from 1 to K. As it is evident for a person skilled in the art, upstream data processing as, for instance, source encoding, symbol interleaving, channel encoding etc. are not depicted in FIG. 1.

The consecutive OFDM symbols are transmitted through a generally time-variant, frequency-selective and noisy channel 2. Channel parameters are denoted by $H_{n,k}$, i.e. are dependent from time (symbol index n) and frequency (sub-carrier index k).

The receiver RX includes an OFDM demodulator 3, a channel estimator 4 and a symbol determination unit 5, which is also termed symbol demapper 5 in the following. The OFDM demodulator 3 transforms the received time-domain signal into the frequency domain yielding received sub-carrier samples $z_{n,k}$. Typically, the OFDM demodulator 3 is implemented as a fast Fourier transform (FFT) stage.

The end-to-end OFDM modem transmission model for information data symbols $a_{n,k}$ may be expressed as $$z_{n,k} = H_{n,k} \cdot a_{n,k} + n_{n,k} \quad (1)$$

where $n_{n,k}$ denotes the thermal noise and other imperfections.

In the receiver RX, the received sub-carrier samples $z_{n,k}$ are fed into the channel estimator 4 and the symbol de-mapper 5. In order to demap the data symbols $a_{n,k}$, the receiver RX must generate channel estimates $\hat{H}_{n,k}$. From equation (1) it is apparent that estimated data symbols $\hat{a}_{n,k}$ may be directly calculated from the received sub-carrier samples $z_{n,k}$ using the channel estimate $\hat{H}_{n,k}$ relating to the same sub-carrier k and the same symbol n. Thus, no ISI (inter-symbol interference) has to be taken into account according to equation (1). As is known in the art of multi-carrier modulation, this is achieved by the implementation of a guard time period $T_g$ for lengthening the useful OFDM symbol time period $T_u$ to the effective OFDM symbol time period $T_{OFDM}$ according to $T_{OFDM} = T_u + T_g$, wherein $T_g$ is equal or longer in duration than the CIR length. As a result, ISI is avoided.

Figure 2:
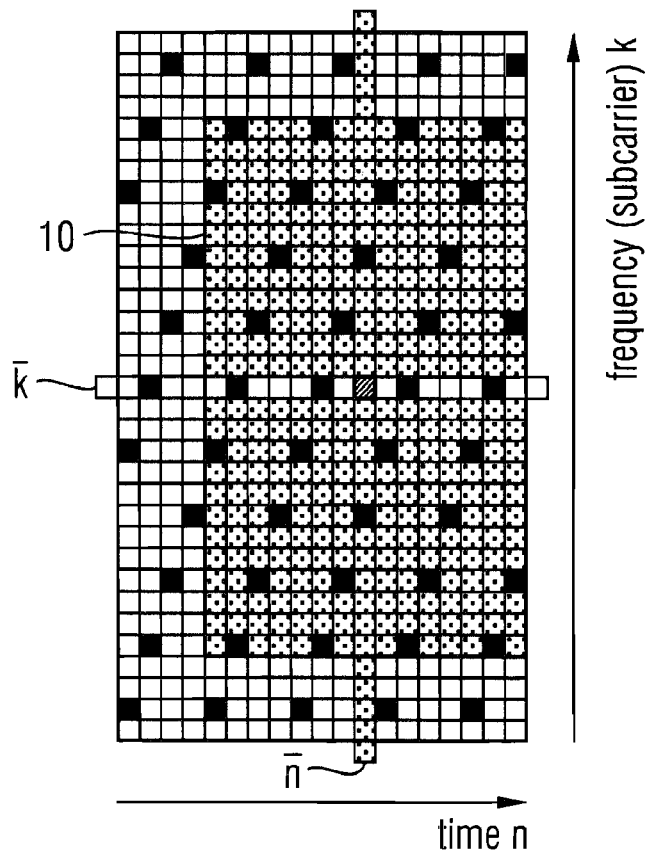
FIG. 2 illustrates a pilot pattern within the time-frequency grid.

In pilot-aided OFDM systems such as, for example, DVB-T/H, channel estimation is based on known pilots $a_{n,k} = p_{n,k}$ which are located at known positions (n,k) in the two-dimensional (2D) OFDM time-frequency grid. As an example, the peculiar non-symmetric DVB-T/H pilot pattern in the time-frequency grid is illustrated in FIG. 2. The frequency (sub-carrier) index k is plotted versus the time (symbol) index n. Pilots $p_{n,k}$ are indicated by filled coordinates squares (n,k).

If the spacing of the pilot symbols $p_{n,k}$ is sufficiently close to satisfy the two-dimensional sampling theorem, channel estimation via interpolation for all coordinates (n,k) is possible. There are at least three basically different approaches for deriving the channel estimates $\hat{H}_{n,k}$.

Figure 3:
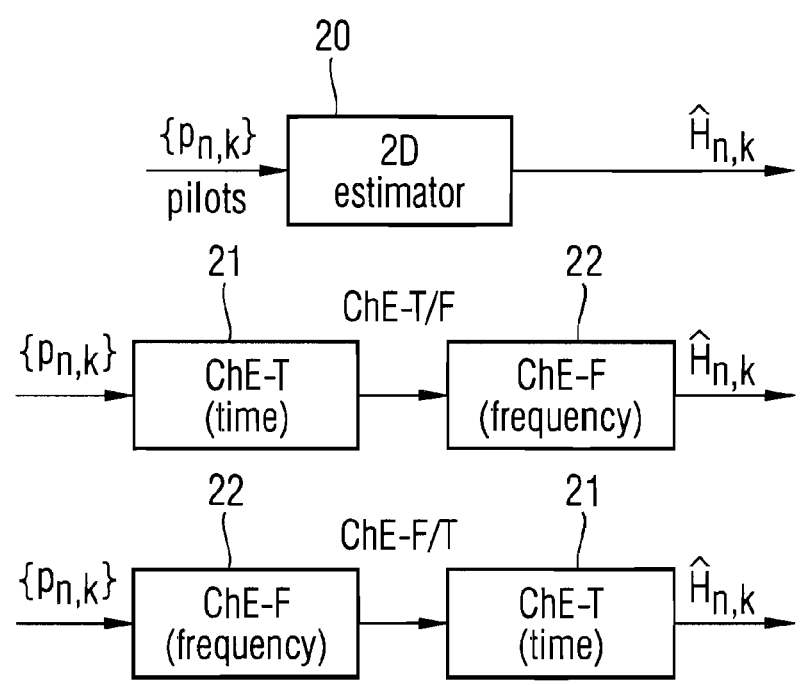
FIG. 3 illustrates three different types of pilot-added channel estimation techniques.

Assume the channel is to be estimated at hatched coordinate square $(\bar{n}, \bar{k})$. A first possibility depicted in the upper part of FIG. 3 is to use a 2D estimator 20 interpolating the channel at the position $(\bar{n}, \bar{k})$ by using all pilots $p_{n,k}$ inside a finite two-dimensional region 10. 2D channel estimation involves a two-dimensional linear FIR (finite impulse response) interpolation filtering of the received pilot samples $p_{n,k}$ within region 10.

Often, 2D channel estimation can be separated into 2×1D channel estimation, which is significantly less complex to implement with respect to optimum 2D channel estimation. 2×1D channel estimation is performed in time direction (ChE-T) and frequency direction (ChE-F), respectively, and may be implemented by a cascade of two linear FIR interpolation filters 21, 22. The case in which time interpolation precedes frequency interpolation is denoted by ChE-T/F and depicted in the middle part of FIG. 3. In this case, time interpolator 21 performs an interpolation in time direction at fixed sub-carrier $\bar{k}$ and frequency interpolator 22 performs an interpolation in frequency direction at fixed time index $\bar{n}$. The alternative case, in which frequency interpolation precedes time interpolation, is denoted by ChE-F/T and is illustrated in the lower part of FIG. 3. In this case, the frequency interpolator 22 precedes the time interpolator 21.

In 2D channel estimation as well as in 2×1D channel estimation, the FIR filter coefficients are typically optimized in the MMSE (minimum mean square error) sense. It is known that a 2D Wiener filter or two 1D Wiener filter provide for optimum MMSE performance. The filter coefficients depend on the pilot and data positions (n,k) and also the channel Doppler-delay/noise characteristics. The 2D estimator 20 requires for each coordinate in the region 10 an individual 2D FIR filter, i.e. an individual set of 2D filter coefficients. In the ChE-T/F case, the time interpolator 21 requires 4 different filters (i.e. 4 sets of filter coefficients) and the frequency interpolator 22 requires 3 different filters (i.e. 3 sets of filter coefficients), because the pilot spacings in the time-frequency directions are (4,3). In the case of ChE-F/T, the frequency interpolator 22 requires 12 different filters (i.e. 12 sets of filter coefficients) and the time interpolator 21 requires 1 filter (i.e. 1 set of filter coefficients), because the pilot spacings in the frequency-time directions are (12,1).

Figure 4:
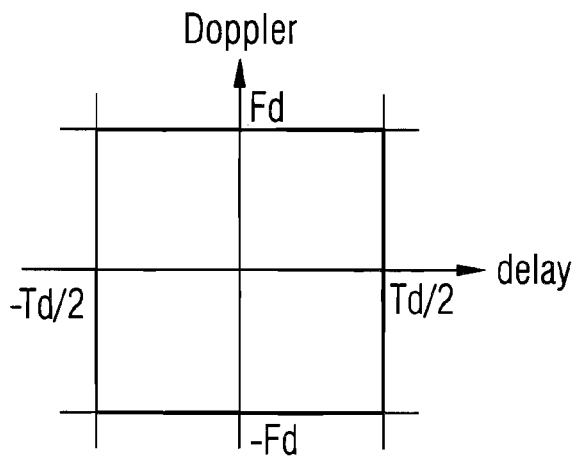
FIG. 4 illustrates the delay-Doppler plane for OFDM signals.

In conventional OFDM channel estimation, channel Doppler spread $F_d$ and channel delay spread $T_d$ are assumed to remain within the rectangular region limited by $\pm F_d$ and $T_d$, respectively, illustrated in FIG. 4. Here, $F_d = f_d / f_{OFDM}$ is the relative Doppler spread, i.e. the channel Doppler spread $f_d$ [Hz] relative to the OFDM symbol frequency $f_{OFDM} = 1/T_{OFDM}$ [Hz]. Similarly, $T_d = \tau_d / T_u$ is the relative delay spread, i.e., the channel delay spread $\tau_d$ [s] relative to the useful OFDM symbol duration $T_u$ [s]. $T_{OFDM} = T_u + T_g$ is the OFDM symbol duration, $T_u$ is the useful OFDM symbol duration, and $T_g$ is the guard interval duration. In the following, when speaking of Doppler spread or delay spread, usually the relative quantities are addressed.

Figure 5:
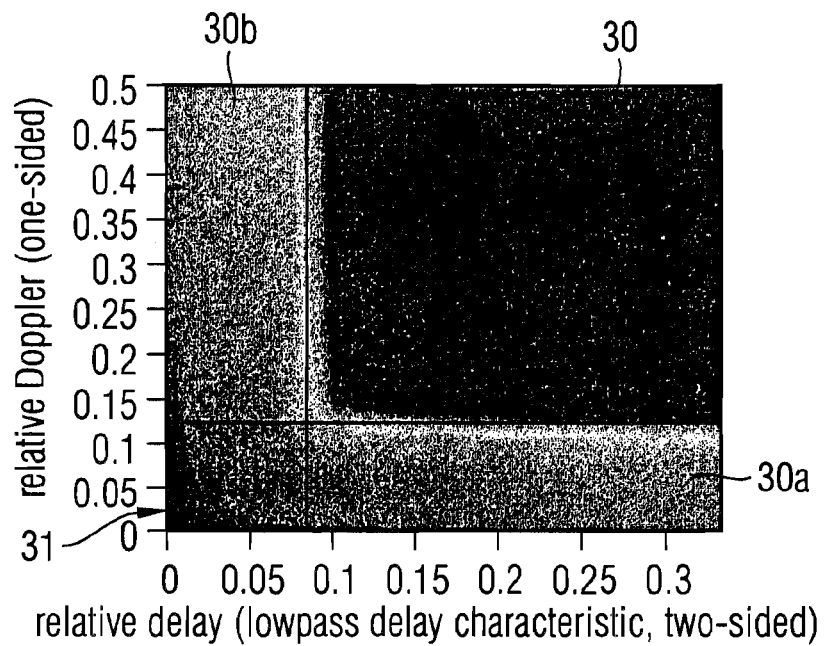
FIG. 5 illustrates the limits of DVB-T/H two-dimensional channel estimation, DVB-T/H one-dimensional time-frequency channel estimation and DVB-T/H one-dimensional frequency-time channel estimation in simulation calculations.

FIG. 5 illustrates the results of a channel estimation simulation calculation for DVB-T/H using an optimum 2D channel estimator 20. The relative Doppler spread (ratio $F_d = f_d / f_{OFDM}$) is plotted versus the relative cluster delay spacing (ratio $T_d = \tau_d / T_u$). The simulation calculation uses the DVB- T/H pilot pattern illustrated in FIG. 2. As already mentioned, the pilot pattern determines the limits of pilot-aided channel estimation in terms of maximum tolerable Doppler spread $F_d$ and (multi-path) delay spread $T_d$. In the shaded area 30 at delay spreads larger than $\frac{1}{12}$ and Doppler spreads larger than $\frac{1}{8}$, channel variations both in the time and the frequency directions are undersampled. As a result, channel estimation is not possible in region 30. In and L-shaped region 31, the 2D sampling theorem is satisfied and channel estimation via interpolation is possible.

The L-shaped region 31 which represents the limits of DVB-T/H 2D channel estimation is composed of a first rectangular area 30a with Doppler spread limit $F_d=\frac{1}{8}$ and delay spread limit $T_d=\frac{1}{3}$ and a second rectangular area 30b with Doppler spread limit $F_d=\frac{1}{2}$ and delay spread limit $T_d=\frac{1}{12}$. Thus, in DVB-T/H channel estimation, the optimum 2D channel estimator 20 is separable into a combination of two 2×1D channel estimators, namely estimators ChE-T/F represented by the estimator cascade 21, 22 and channel estimators ChE-F/T represented by the estimator cascade 22, 21, cf. FIG. 3.

The provision of channel estimation limits illustrated in FIG. 5 for the example of DVB-T/H 2D channel estimation using the pilot pattern of FIG. 2 may be generalized to arbitrary OFDM systems. Channel estimation is impossible in an undersampled time-frequency-region 30 in which high delay spreads (beyond the limit $T_d$) and high Doppler spreads (beyond the limit $F_d$) occur simultaneously.

Figure 6:
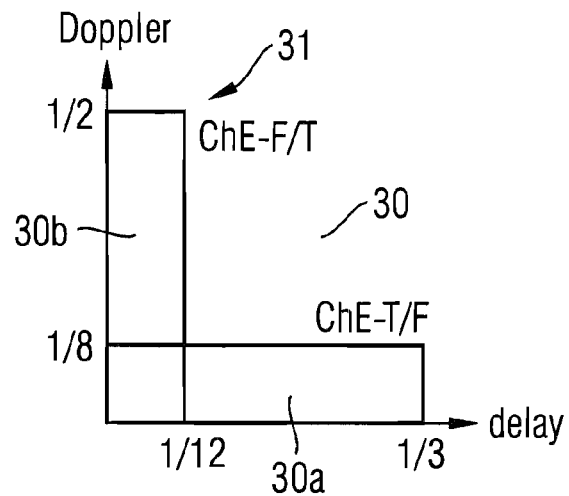
FIG. 6 illustrates the results of the simulation calculations illustrated in FIG. 5 in a simplified representation.

High Doppler spreads arise when the receiver RX is moved relative to the transmitter TX with considerable or high velocity. High delay spreads may occur when two distant transmitters contribute to the signal received at the receiver RX. As an example, large delay spreads are typically encountered in single frequency networks (SFN), which use time synchronized transmitters distributed under a distance of about tens of kilometers among each other. As the distant transmitters transmitting the same signal use the same carrier frequency and same time synchronization, no hand-over is necessary when the receiver RX moves from one radio cell associated with a first transmitter to a second radio cell associated with a second transmitter in a SFN. However, as the distance between the receiver RX and the first transmitter may differ from the distance between the receiver RX and the second transmitter by tens of kilometers, the signal propagation times of signals from the two transmitters may be substantially different. This results in a potentially large delay spacing between signal contributions received from different transmitters. Such delay spacings attributed to distant transmitters may be the cause for a delay spread extending beyond the 1D estimation limit for ChE-F/T estimation (in FIGS. 5 and 6: $T_d=\frac{1}{12}$). Simply spoken, a receiver RX at high speed may fail to detect signals from two or more transmitters.

In one embodiment, delay spread is also caused by multi-path propagation between a single transmitter TX and the receiver RX. The delays caused by multi-path propagation associated with a single transmitter TX are typically smaller than the delay spread limit $T_d$. Thus, multi-path propagation from a single transmitter TX usually does not cause the received signal to leave the region 31 of detectability. However, this is not necessarily the case. In one or more embodiments, for instance, if signal components from a single transmitter are reflected at mountains or other distant objects, it may be the case that well-known single transmitter multi-path propagation may give rise to signal delays (of signal components transmitted over different paths) similar to the delay spread limit $T_d$. A "single transmitter" in the meaning used herein may also be a transmitter employing multiple transmit antennas.

Figure 7:
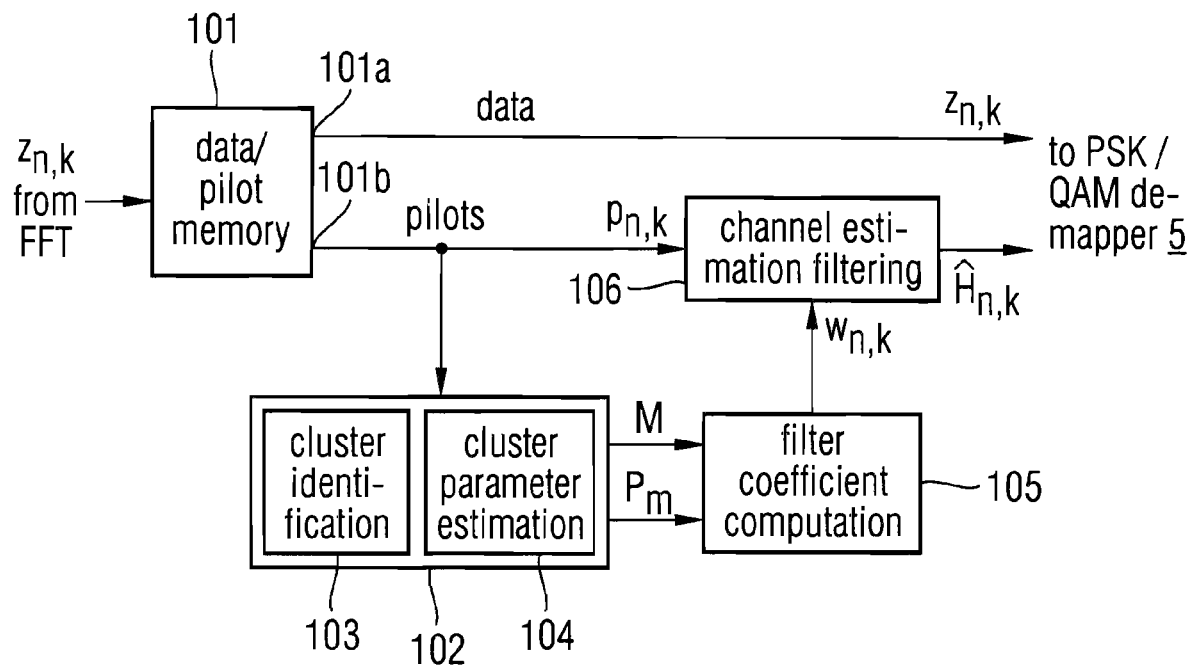
FIG. 7 is a block diagram of a channel estimator using information on signal reception characteristics according to a first embodiment.

FIG. 7 illustrates a block diagram of a first embodiment. The same reference signs relate to like parts as illustrated in other figures. Received sub-carrier samples $z_{n,k}$ output from the OFDM demodulator 3 (cf. FIG. 1) are input into a data/pilot memory 101. The data/pilot memory 101 outputs data symbols (for simplification also denoted as $z_{n,k}$) at a first output 101a and outputs pilots (i.e. pilot symbols) $p_{n,k}$ at a second output 101b. Pilots $p_{n,k}$ are fed into a signal evaluation device 102. The signal evaluation device 12 includes a first unit 103 which is configured to identify and output a quantity M indicating the number of signal clusters contributing to the received signal. In most cases (except the case of a large delay spacing in single transmitter multi-path propagation as mentioned above), the number M of signal clusters contributing to the received signal is identical to the number of (distant) transmitters TX contributing to the received signal, as each transmitter TX illustrates up at the receiver RX as a cluster of multi-path signal contributions. Thus, the first unit 103 is also termed cluster identification unit. Further, the signal evaluation device 102 includes a second unit 104 which outputs one or more parameters $P_m$ indicative of characteristics of the identified clusters. For instance, these parameters may describe the Doppler-delay profiles of the clusters, i.e. the regions in the Doppler-delay plane which are presumably occupied by the multi-path signal components of the clusters.

It is to be noted that a signal cluster (which is identified in the cluster identification unit 103) may be composed of multiple signal components as typically received in a multi-path signal propagation scenario from one transmitter. However, it may also be possible that a signal cluster only includes one received signal, for instance the line-of-sight signal if no substantial signal reflections are present or one major reflection signal caused by a distant reflection object.

The number M and the parameter(s) $P_m$ are input to a filter coefficient computation unit 105. The filter coefficient computation unit 105 uses M and $P_m$ for computation of channel estimation filter coefficients $w_{n,k}$. The channel estimation filter coefficients $w_{n,k}$ are used for channel estimation filtering in a channel estimation filter 106. The channel estimation filter 106 may be from any type described in conjunction with FIG. 3, i.e. may be a 2D channel estimation filter or a 2×1D channel estimation filter cascade ChE-T/F or ChE-F/T.

According to FIG. 1, data symbols $z_{n,k}$ and the generated channel estimates $\hat{H}_{n,k}$ are fed into the symbol determination unit 5. The symbol determination unit 5 may be a PSK (phase shift keying) and/or QAM (quadrature amplitude modulation) symbol demapper.

Figure 8:
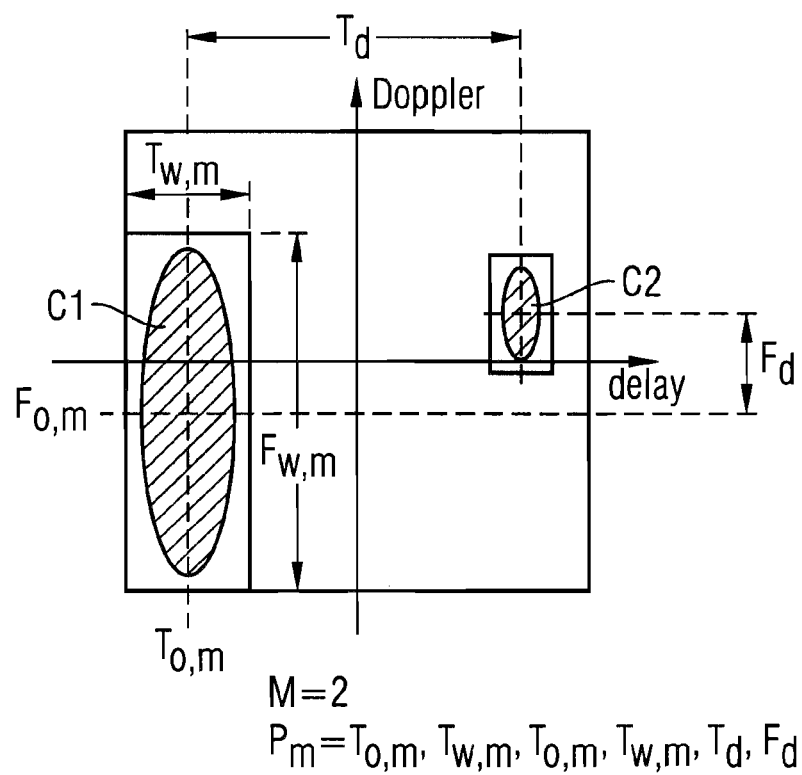
FIG. 8 illustrates signal reception characteristics in the time-Doppler plane in a two transmitter scenario.

FIG. 8 illustrates by way of example which information M, $P_m$ relating to characteristics of the (mobile) channel may be passed from the signal evaluation device 102 to the filter coefficient computation unit 105. FIG. 8 is a plot of the Doppler shift versus delay at the receiver RX. An SFN channel scenario is assumed in which two transmitters TX contribute to the received signal. As a result, a first (multi-path) cluster C1 from the nearer transmitter and a second (multi-path) cluster C2 from a more distant transmitter illustrate up in the Doppler-delay plane. Thus, M=2 in this example.

Each cluster profile C1, C2 in the Doppler-delay plane may be parameterized according to a desired accuracy. In many cases it will be sufficient to approximate a cluster profile by a simple-shaped superset, for instance a rectangular area in the Doppler-delay plane as illustrated in FIG. 8. In this case, the cluster profile may be described in terms of a few parameters, namely $P_m=T_{0,m}, T_{w,m}, F_{0,m}, F_{w,m}, T_d, F_d$. $T_{0,m}$ is the delay shift of cluster m, $T_{w,m}$ is the delay width of cluster m, $F_{0,m}$ is the Doppler shift of cluster m, $F_{w,m}$ is the Doppler width of cluster m, $T_d$ is the delay spread caused by M clusters and $F_d$ is the Doppler spread caused by M clusters. As it is apparent for a person skilled in the art, also a subset of the parameters $P_m$ may be used to characterize the channel conditions or it is possible to add further parameters if convenient, for instance if a more accurate approximation of the cluster profiles is desired.

The number M of multi-path clusters and parameters $P_m$ may, for instance, be obtained by measurement, by evaluation of additional information such as positional information or may be known a priori. FIG. 9 illustrates how to obtain M, $P_m$ by indirect measurement. The circuitry includes a unit 107 for estimating the quality of the reconstructed signal, e.g., a BER (bit error ratio) estimation unit. Further, the signal strength of the received OFDM signal is measured by a signal strength measurement unit 108. The estimated BER and the measured signal strength are communicated to the first unit 103 and the second unit 104.

In case of insufficient BER despite of sufficient signal strength, the first unit 103 makes the hypothesis M=2. Further, the second unit 104 outputs at least one parameter $P_m$ to the filter coefficient computation unit 105. For instance, the (sole) parameter $T_d$ (cluster delay spread) is communicated to the filter coefficient computation unit 105. The value of $T_d$ may also be a hypothesis or default initial value. Then, channel estimation is performed on the basis of sets of filter coefficients $w_{n,k}$ which are selected dependent on the input values M, $T_d$ and the quality of the reconstructed signal is measured in the unit 107 for signal quality estimation. Then, the parameter $T_d$ may be stepped through a series of values and the signal quality measured by unit 107 is compared to the signal strength measured by unit 108. Under the hypothesis M=2, an optimum or target value for $T_d$ is found where the signal quality to signal strength ratio is maximum or sufficiently high, respectively. This indirectly measured cluster delay spread $T_d$ is then used for further operation.

It is to be noted that other hypothesis values M=3, . . . may be selected and that the optimization procedure described above may be periodically repeated for updating the selection of M and $P_m$. Further, the optimization procedure may involve a plurality of parameters $P_m$.

FIG. 10 illustrates another circuitry for obtaining values for M and $P_m$. The circuitry already explained in conjunction with FIGS. 7 and 9 further includes a positioning device 109. The positioning device 109 may be a satellite positioning device, e.g., a GPS (global positioning system) device or any other navigation system. The positioning device 109 communicates actual positional data r to the first unit 103 and to the second unit 104 and may communicate actual velocity data v to the second unit 104.

If the locations of the transmitters TX are known (e.g., by digital maps or code sent by SFN stations) and the actual position of the receiver RX is known, the first unit 103 may make a decision on the number M as being equal to the number of transmitters contributing to the received signal known from positional information (in this case it is assumed that each signal cluster present in the received signal is caused by one transmitter).

Further, the same information allows the second unit 104 to calculate the distances to the transmitters TX and thus the relative cluster delays $T_{0,m}$ and the delay spread $T_d$. Further, the cluster Doppler width $F_{w,m}$ may be estimated from the distances between the receiver RX and the respective transmitters TX. Typically, the second cluster C2 exhibits a narrower cluster Doppler width than the first cluster C1 since a more pronounced Doppler spectrum is typical for signals traveling longer distances. Even without positioning device 109, if the second unit 104 has e.g., access to the electronic odometer reading, it can—knowing its own receive channel frequency—compute the (maximum) Doppler spread $F_d$. If, in addition, the mobile has knowledge of its travel direction (from the positioning device 109), the cluster Doppler shifts $F_{0,m}$ can also be deduced.

Further, in many relevant cases, some of the parameters $P_m$ are known a priori. As an example, the cluster delay width $T_{w,m}$ is known in SFN networks and given by the cluster delay width of a single-cluster mobile channel (e.g., TU6).

The approach to measure M and $P_m$ as exemplified in FIG. 9 and the approach to derive values for M and $P_m$ from positional information as well as the approach to use a priori knowledge of values for M and $P_m$ may be combined.

The filter coefficient computation unit 105 may perform an online-calculation of updated sets of filter coefficients $w_{n,k}$ directly from the coordinate information (n,k), the number M of multi-path clusters and parameters $P_m$. This may involve complex matrix operations of high dimension. In the following, it is presented a typical example of how to compute the Wiener interpolation filter coefficients. It is desired to estimate the channel $H_{n,k}$ at a particular position in the 2D grid; this desired channel coefficient is abbreviated by a (complex-valued) scalar H. Channel estimation is based on a set of known (complex-valued) pilots at known positions in the 2D grid. Thus, all of these pilots are collected in an 1D pilot vector $P=\{p_{n,k}\}$. The problem is therefore to estimate scalar H from vector P. Given that all quantities are zero-mean Gaussian (as is generally assumed in channel estimation), the optimal MMSE estimator of H given P is known to be a linear Wiener FIR filter given by $$\hat{H}(P)=E[H|P]=\Sigma_{HP}\Sigma^{-1}_{PP}P=W^TP$$

with $$W=(\Sigma_{HP}\Sigma^{-1}_{PP})^T$$

the FIR Wiener filter coefficient vector, $$\Sigma_{HP}=E[HP^H]$$

the cross-correlation vector between the desired channel H and the received pilot vector P, and $$\Sigma_{PP}=E[PP^H]$$

the auto-correlation matrix of the received pilot vector P.

Now the cross-correlation vector $\Sigma_{HP}=E[HP^H]$ depends on the location of the desired channel H relative to the pilots P and, more importantly, on the Doppler/delay profile. Likewise, the auto-correlation matrix $\Sigma_{PP}=E[PP^H]$ depends on the pilot locations, the channel noise power and the Doppler/delay profile. In conclusion, the optimal channel estimator filter coefficients follow directly from a particular Doppler/delay profile assumed in the derivation.

Figure 11:
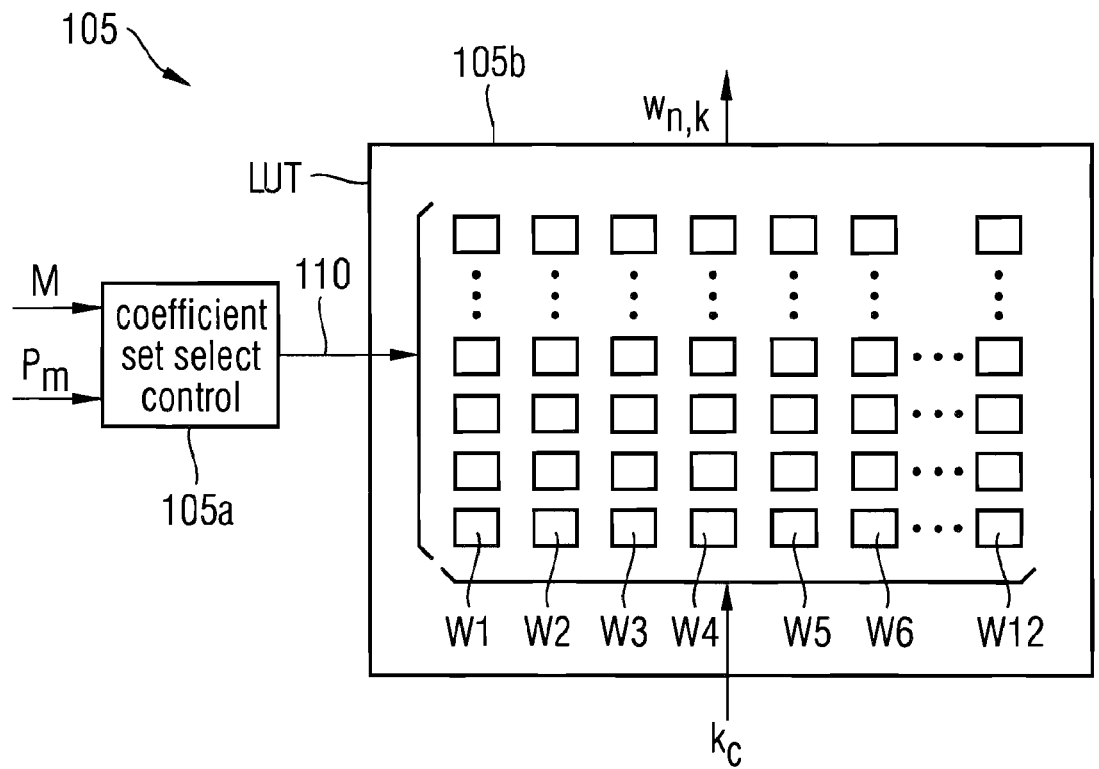
FIG. 11 is schematic illustration of the organization of a filter coefficient computation unit using a look-up table.

According to another possibility, the filter coefficients used in channel estimation and interpolation (2D and 2×1D alike) may be pre-computed off-line and stored in a lookup table LUT for a finite set of possible multi-path clusters characteristics information M, $P_m$. Pre-computation of filter coefficients for different values of M and $P_m$ may be performed as explained above. FIG. 11 illustrates the organization of such filter coefficient computation unit for the case of a 2×1D channel estimation and interpolation using estimator ChE-F/ T. The filter coefficient computation unit 105 includes a coefficient set select control 105a and a lookup table LUT 105b.

The lookup table LUT is used to provide sets of filter coefficients for advanced ChE-F/T channel estimation responsive to multi-path cluster information M, $P_m$. Assuming the DVB-T/H pilot pattern illustrated in FIG. 2, twelve sets W1, W2, W3, W4, W5, W6, ..., W12 of filter coefficients $w_{n,k}$ are stored for each reception characteristics information parameterized by M, $P_m$. Thus, for fixed M, $P_m$, for each value of a cycle sub-carrier index $k_c$=1, 2, ..., 12, a set W1, W2, W3, W4, W5, W6, ..., W12 of filter coefficients $w_{n,k}$ for channel estimation filter 22 (ChE-F estimator) is stored. These sets W1, W2, W3, W4, W5, W6, ..., W12 of filter coefficients are written into the frequency channel estimator 22 (ChE-F estimator) responsive to the cycle index $k_c$ running from 1 to 12 in course of the interpolation in the frequency direction.

Every column of sets of filter coefficients is thus associated with a specific value of cycle index $k_c$. A row of filter coefficient sets is associated with reception characteristics parameterized by M, $P_m$. Thus, for each value of M and parameters $P_m$, a specific row of sets of pre-calculated filter coefficients is selected by the output signal 110 of the coefficient set select control 105a.

Figure 12:
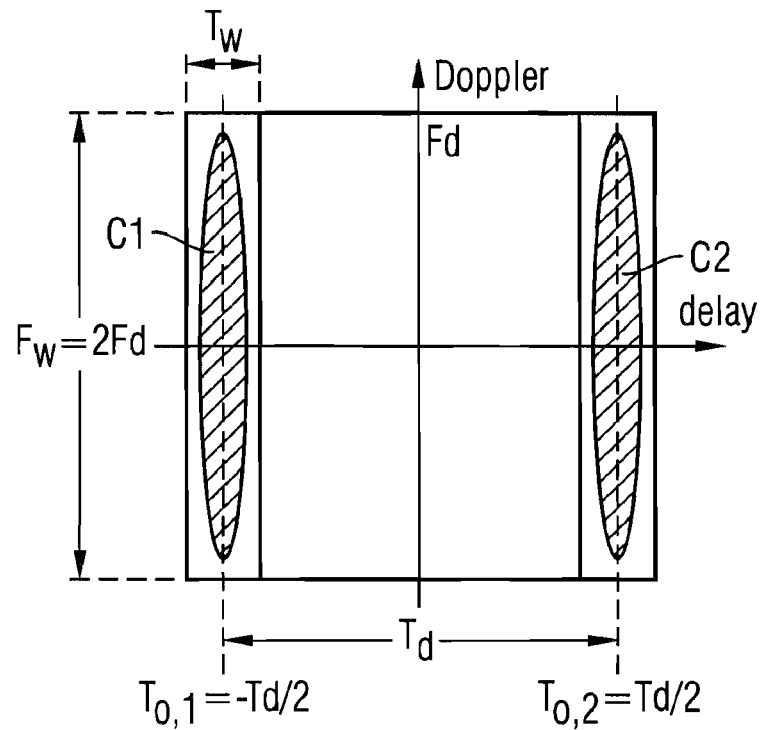
FIG. 12 illustrates signal reception characteristics in the Doppler-delay plane in a two transmitter scenario.
Figure 13:
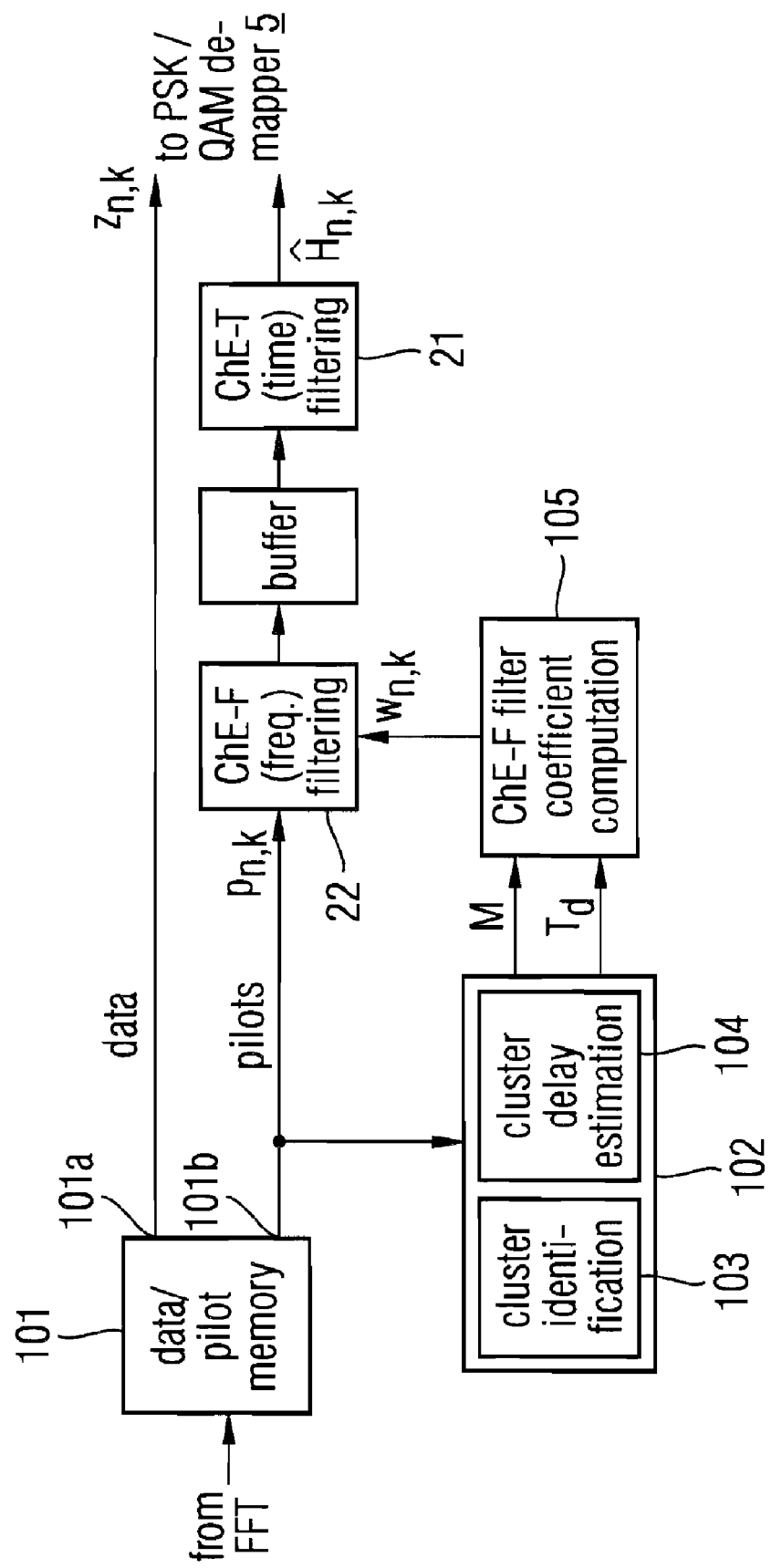
FIG. 13 is a block diagram of a second embodiment of a channel estimator using information on signal reception characteristics.
Figure 14:
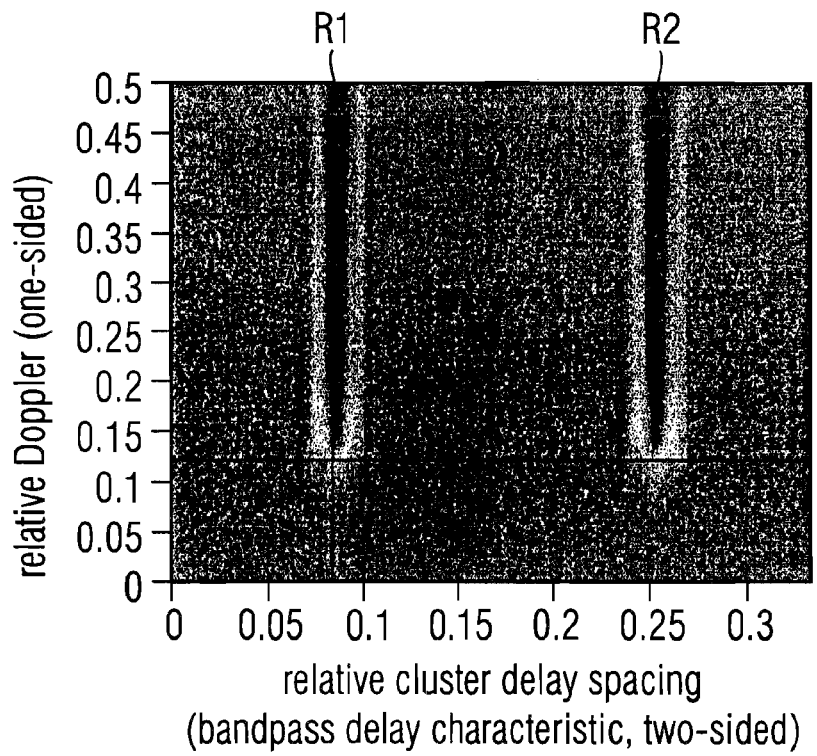
FIG. 14 illustrates the channel estimation performance in form of simulation calculation results for the channel scenario depicted in FIG. 12 and using a channel estimator according to the second embodiment illustrated in FIG. 13.

FIGS. 12 to 14 further relate to the example of DVB-T/H using the pilot symbol pattern illustrated in FIG. 2. According to FIG. 12, an SFN channel with two multi-path clusters C1, C2 is considered. In this SFN scenario, signals from two distant TV transmitters TX which are tens of kilometers apart causing a delay spread $T_d$ up to approximately 200 μs are picked up at the DVB-T/H receiver RX. Each of the multi-path clusters C1, C2 is essentially a mobile channel with small delay width of about $T_w$=5 μs (assuming a TU6 channel). In this example, only the cluster delay spread $T_d$, i.e. the cluster delay spacing between multi-path cluster C2 and multi-path cluster C1, and M=2 are used in channel estimation. Thus, only the ChE-F frequency channel estimation and interpolation filter 22 is adapted to these parameters, as may be seen from FIG. 13. Note that in this example, 2D filtering is separable into 2×1D estimators operating in time and frequency directions as explained above in conjunction with FIG. 3.

In the two-cluster case M=2, it may be advantageous to position via timing synchronization the multi-path clusters C1 and C2 such that their delays are symmetric about zero as illustrated in FIG. 12. This renders the ChE-F filter 22 coefficients $w_{n,k}$ real-valued and thus reduces the computational complexity to that of conventional frequency filtering. However, it is also possible to perform channel estimation using the 1D channel estimator ChE-F/T for M=3 or even larger values. Further, as already mentioned in conjunction with FIG. 11, the ChE-F filter coefficients may be pre-computed for a set of possible delay spreads and then selected in accordance with the cluster delay spread estimate $T_d$.

FIG. 14 illustrates the simulation calculation results obtained for the channel estimator illustrated in FIG. 13 and a SFN scenario based on M=2 clusters C1 and C2 of similar cluster Doppler width $F_w$ as illustrated in FIG. 12. Only in the two black regions R1 and R2 representing a cluster delay spread $T_d$ close to 1/12 (region R1) and 1/4 (region R2), insufficient channel estimation performance is observed. Note that region R1 and region R2 illustrate up at odd multiples of pilot sampling rate in the frequency direction. In the residual Doppler-delay plane outside of regions R1 and R2, channel estimation is made possible by taking into account M and $T_d$ for ChE-F filter coefficient computation.

Thus, the DVB-T/H channel estimator illustrated in FIG. 13 now covers almost the entire Doppler-delay plane in contrast to FIG. 5, where channel estimation is inhibited in area 30.

When three or more clusters with delays $T_{0,1}, ..., T_{0,M}$ are present, regions R1, R2 ... with insufficient channel estimation performance appear at all occasions where any pair of cluster delay spreads $|T_{0,m}-T_{0,n}|(n \neq m)$ is close to 1/12 or 1/4. If cluster delays are independent identically distributed and not larger than the maximum guard time interval length (1/4), the probability of hitting a black zone R1, R2 ... resulting in ChE-F estimation failure in the high-Doppler region is about 7% for M=2 clusters and about 21% for M=3 clusters.

Figure 15:
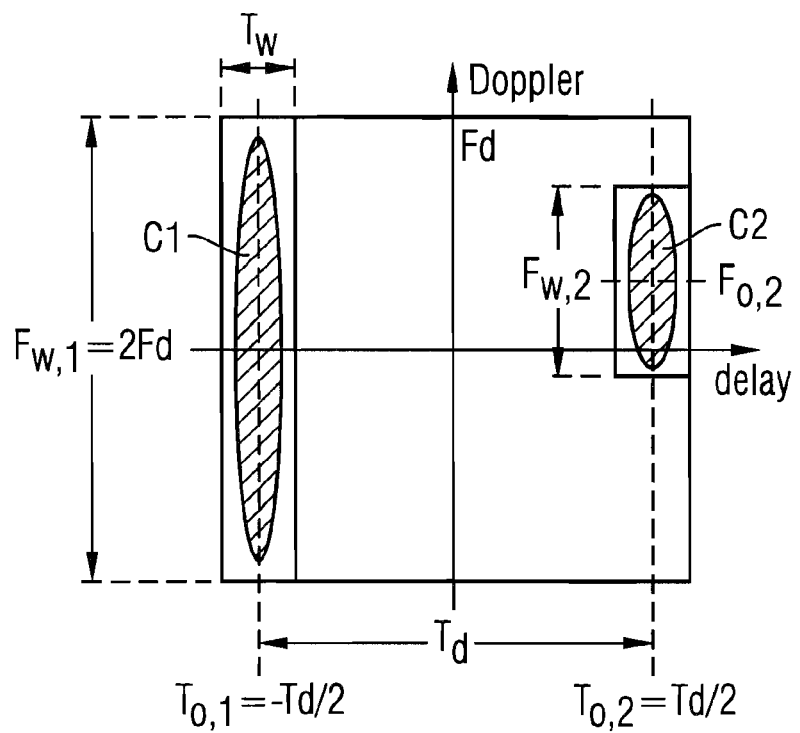
FIG. 15 illustrates another signal reception characteristics in the Doppler-delay plane in a two transmitter scenario.
Figure 16:
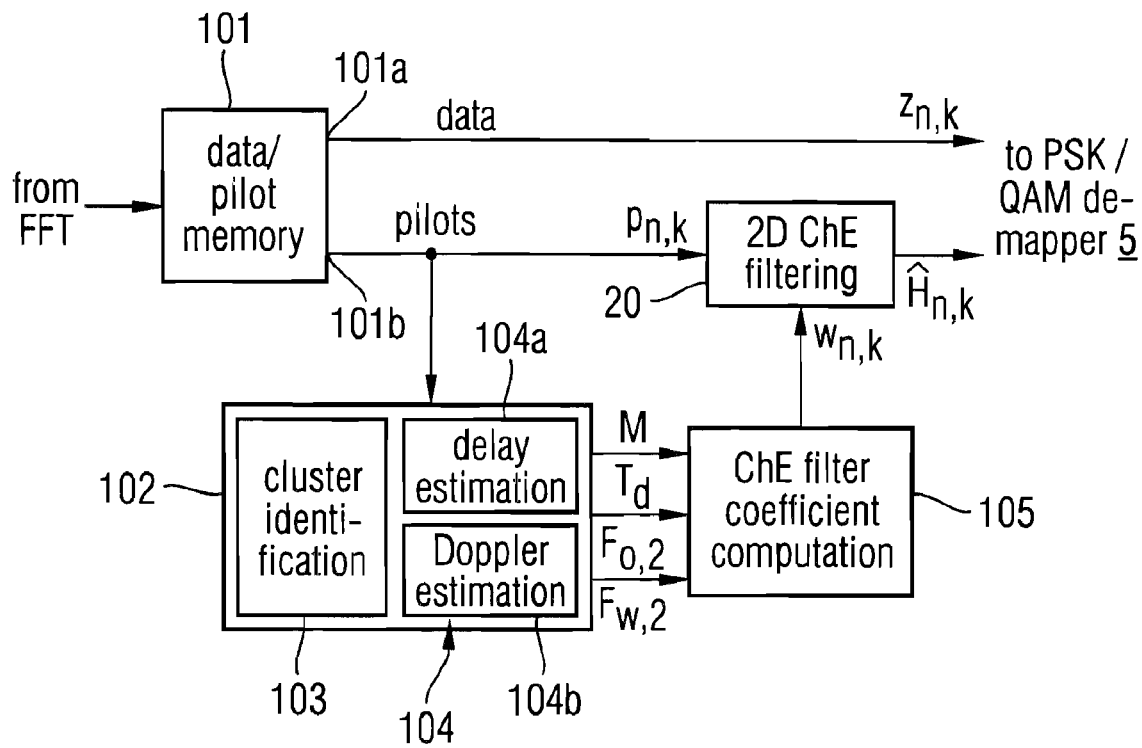
FIG. 16 is a block diagram of a third embodiment of a channel estimator using information on signal reception characteristics.
Figure 17:
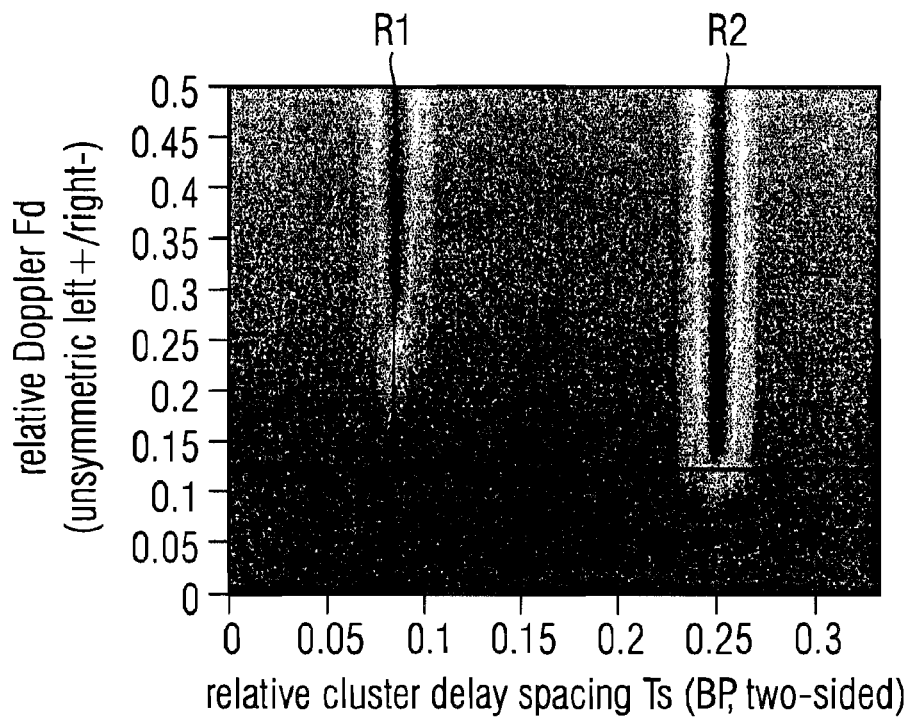
FIG. 17 illustrates the channel estimation performance according performance analysis results for the channel scenario depicted in FIG. 15 and using a channel estimator according to the third embodiment illustrated in FIG. 16.

FIGS. 15, 16, 17 relate to an SFN channel with two (multi-path) clusters (M=2) and individual cluster Doppler spectra. Again, DVB-T/H using the pilot pattern depicted in FIG. 2 is taken for purpose of example. In this SFN scenario, the second cluster C2 exhibits a narrower Doppler spread than the first cluster C1, i.e. $F_{w,2} < F_{w,1}$. As already mentioned, the more pronounced Doppler spectrum of cluster C2 is an indication that the second transmitter is more distant from the receiver than the first transmitter.

Again, each of the clusters C1, C2 is essentially a mobile channel with the same small delay width $T_{w,1}=T_{w,2}=T_w$. Here, the second unit 104 includes a delay estimation unit 104a and a Doppler estimation unit 104b. As both the cluster delay information and the cluster Doppler information are used in channel estimation, the 2D channel estimator 20 is not easily separable. Therefore, channel estimation as illustrated in FIG. 16 uses 2D ChE filtering for generating the channel estimates $\hat{H}_{n,k}$. 2D ChE filter coefficient computation is done in unit 105 in dependence from e.g., M, $T_d$, $F_{0,2}$ and $F_{w,2}$ for instance by using a lookup table with pre-computed sets of filter coefficients $w_{n,k}$ as explained above in conjunction with FIG. 11. Note that the access to the lookup table now is additionally dependent from a cyclic symbol number $n_c$ resulting in that sets of pre-computed filter coefficients $w_{w,k}$ were here to be visualized in a three dimensional array representation.

With regard to FIG. 17 showing performance analysis results obtained for the channel estimator illustrated in FIG. 16 and a SFN scenario as illustrated in FIG. 15, it is found that negative Doppler shifts $F_{0,2}$ yield better channel estimation performance than positive Doppler shifts, i.e. yield a higher tolerable Doppler at critical delay spacing 1/12 as it is apparent in FIG. 17. Again, dark regions R1 and R2 close to cluster delay spreads of 1/12 and 1/4 are indicative of channel estimation failure. It may be seen that using the additional cluster Doppler information further reduces the probability of failure in the high-Doppler region for two clusters (M=2). An analogous behavior is found for a higher number of M=3 ... clusters.

Figure 18:
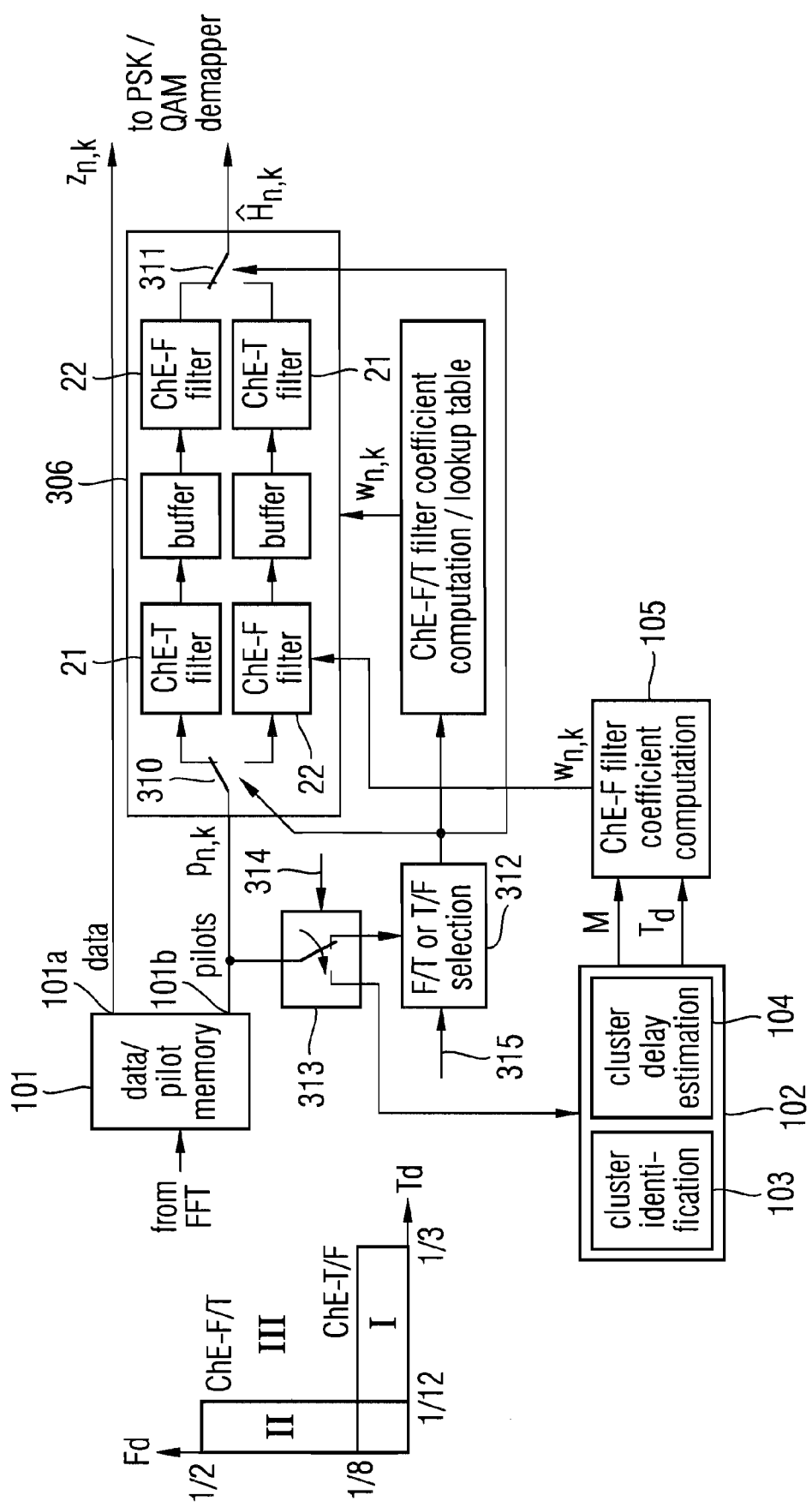
FIG. 18 is a block diagram illustrating a fourth embodiment of a channel estimator.

FIG. 18 illustrates a further embodiment which uses cluster delay information for channel estimation if certain conditions are met. The channel estimator 306 is a 1D channel estimator having two filter cascades, namely a ChE-T/F cascade having a ChE-T filter 21 followed by a ChE-F filter 22 and a ChE-F/T cascade having a ChE-F filter 22 followed by a ChE-T filter 21. Switches 310, 311 are arranged upstream and downstream from the channel estimator 306, respectively, and are configured to select one of the 1D channel estimators ChE-T/F or ChE-F/T. The switches 310, 311 are controlled by a F/T or T/F selection unit 312. Pilot symbols $p_{n,k}$ may be fed into the F/T or T/F switch selection unit 312 via a switch 313 if switch 313 is in a first position. Being in a second position, the switch 313 interconnects the output 101b of the data/pilot memory 101 to an input of the signal evaluation device 102. Switch 313 is controlled by an advanced channel estimation control signal 314. F/T or T/F selection unit 312 is kept informed on the quality of the reconstructed signal (e.g., BER) and the signal strength of the received signal at input 315.

Figure 19:
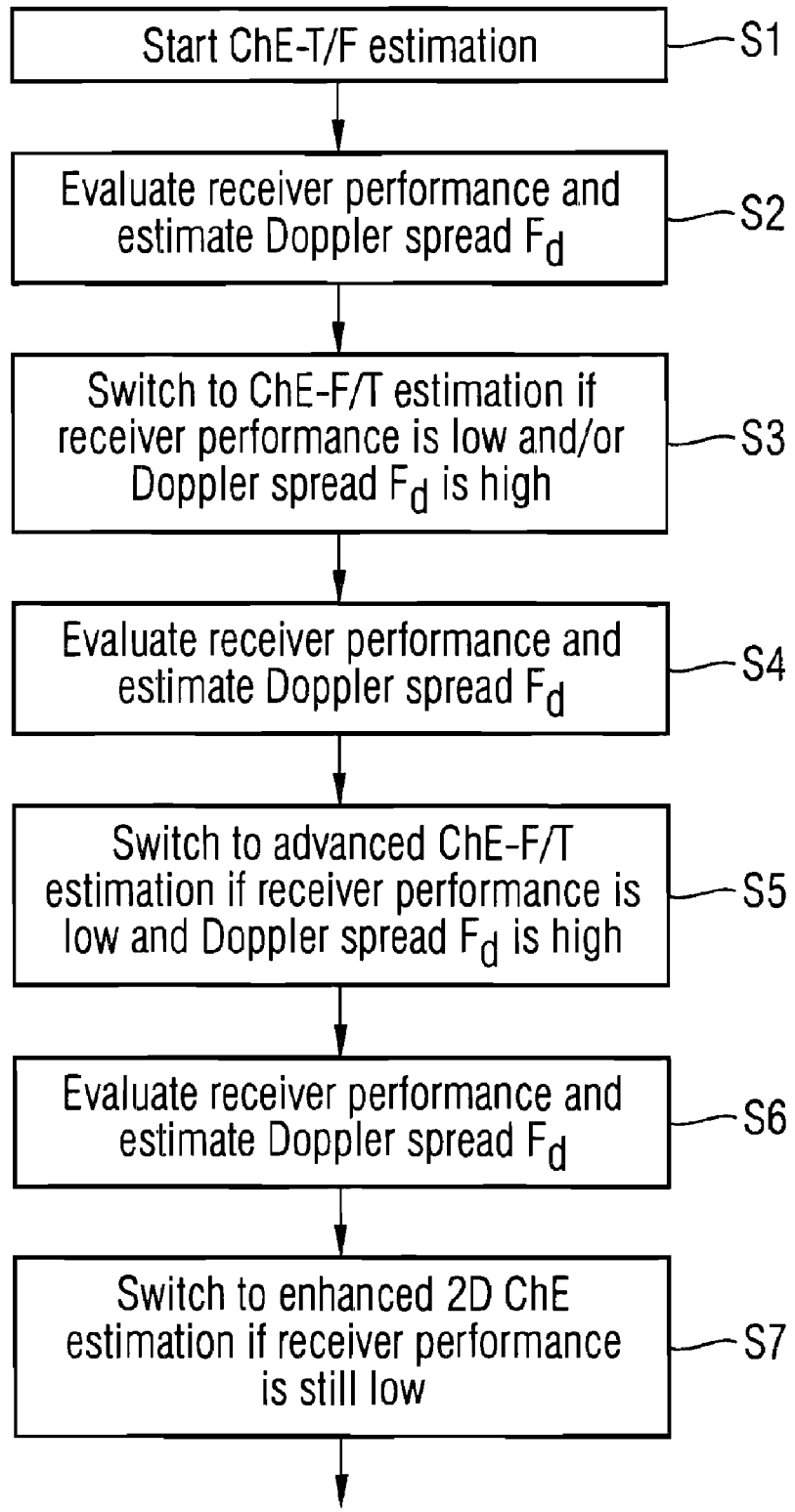
FIG. 19 is a flow chart illustrating a procedure for selecting various channel estimation modes in a channel estimator.

FIG. 19 illustrates a possible mode of operation of the channel estimator illustrated in FIG. 18. DVB-T/H reception is started using ChE-T/F estimation. In this channel estimation mode, switches 310, 311 and 313 are in the positions illustrated in FIG. 18. This 1D mode of equalization is matched to long delay spreads $T_d=1/12$ to $1/3$ and small or moderate Doppler spreads $F_d<1/8$, i.e. the area in the Doppler-delay plane indicated by I in the diagram illustrated in left part of FIG. 18.

In S2, the receiver performance is evaluated. This may be done by comparing BER and the input signal strength at the F/T or T/F selection unit 312. Further, the channel Doppler spread $F_d$ may be estimated in the F/T or T/F selection unit 312. Doppler spread estimation may be based on scattered pilot symbols $p_{n,k}$ or continual pilot symbols which are also present in DVB-T/H. A variety of algorithms exist to reliably estimate Doppler spreads $F_d$ from these pilot symbols.

In S3, if the receiver performance is low (i.e. insufficient BER despite of sufficient signal strength) and/or the Doppler spread $F_d$ is large, the actual 1D channel estimation mode ChE-T/F is switched to 1D channel estimation mode ChE-F/T. Switching is caused by the F/T or T/F selection unit 312 controlling the switches 310, 311. 1D channel estimation mode ChE-F/T is matched to short delay spreads $T_d<1/12$ and large Doppler spreads $F_d=1/8$ to $1/2$, i.e. region II in the Doppler-delay plane illustrated in the left part of FIG. 18.

In S4, the same as in S2, the receiver performance and the Doppler spread $F_d$ are continually monitored.

In S5, if the receiver performance is still low (e.g., BER still insufficient despite of sufficient signal strength) and Doppler spread $F_d$ is large, 1D advanced channel estimation ChE-F/T according to the embodiment illustrated in FIG. 13 is invoked. That is, the number M of multi-path clusters along with delays $T_{0,1}, \ldots, T_{0,M}$ are estimated. As already mentioned, another possibility is through a series of predefined cluster timing parameter sets, e.g., M=2, $T_w=1/32$, $T_d=T_{0,2}-T_{0,1}=1/12$, $1/12+T_w/2$, ... and to select 1D channel estimation ChE-F/T filter coefficients accordingly. During each iteration, the receiver performance (BER and input signal strength) and the Doppler spread $F_d$ are continually monitored. After each unsuccessful iteration, it is switched to a next set of multi-path cluster timing parameters.

Further, it is possible that the channel estimator 306 illustrated in FIG. 18 is additionally equipped with a 2D channel estimator 20 (not depicted in FIG. 18) for advanced channel estimation using additional cluster information M, $P_m$ as illustrated in FIG. 16. In this case, the process outlined above may be continued by the following S7.

In S7, if 1D advanced channel estimation tried in S5, S6 is still unsuccessful, advanced 2D channel estimation according to FIG. 16 is accomplished, i.e. the number M of multi-path clusters along with their delay parameters $T_{0,m}, T_{w,m}$ and their Doppler parameters $F_{0,m}, F_{w,m}$ are estimated and used for 2D channel estimation. Again, another possibility is through the same series of predefined multi-path cluster timing parameters used in S6 and in addition successively narrow down the Doppler spread $F_{w,m}$ of long-delayed multi-path clusters and to select 2D ChE filter coefficients accordingly. After each unsuccessful iteration, it is switched to a next set of cluster timing-Doppler parameters.

The following general remarks apply to the embodiments described above.

Again, it is to be noted that some or all channel and cluster parameters M, $P_m$ may be available to the mobile receiver a priori. Whenever this is the case, such a priori information may be used in channel estimation, making it unnecessary to obtain such information by way of measurement or an iterative trial-and-error procedure.

Doppler and delay parameters may be chosen such that 2D channel estimation is separable into 2×1D channel estimation ChE-T/F and/or ChE-F/T.

Doppler and delay parameters $P_m$ used in estimation filter coefficient computation may be chosen such that they are symmetric about their origin. Symmetric delay parameters yield real-valued coefficients for the ChE-F channel estimation filter 22. Symmetric Doppler parameters yield real-valued coefficients for the ChE-T channel estimation filter 21.

Further, it is to be noted that the process of channel estimation may be partitioned into several phases. In particular, initial channel acquisition may include the estimate of coarse measurement values for channel delay parameters and Doppler parameters. Large and simple Doppler-delay areas (for instance rectangles or polygons) covering the Doppler-delay profiles C1, C2 (cf. FIG. 8) may be chosen, e.g., even the entire Doppler-delay plane as in conventional 2D channel estimation ChE. Subsequently, channel tracking may be performed by continually estimating and refining channel/cluster (i.e. M) as well as Doppler/delay (i.e. $P_m$) information, tracking possible (slow) variations in Doppler/delay parameters $P_m$ and use these updated parameters $P_m$ in filter coefficient computation.

As already mentioned, the filter coefficients used in 2D and/or 2×1D channel estimation and interpolation may be pre-computed off-line and stored in a lookup table for a finite set of possible cluster Doppler/delay parameters. During on-line operation, the channel estimator is then adapted by updating the cluster Doppler/delay parameter estimate and selecting and loading the filter coefficient vector which fits best to that Doppler/delay parameter estimate.

Further, in channel estimation, in particular during channel tracking, it is possible to use additional information contained in the received OFDM symbols, e.g., continual pilot symbols, TPS (transmission parameter signaling) symbol decisions, random data symbol decisions (i.e. a decision-directed approach) and/or estimates of bit and/or frame error rates. In particular, the reconstructed signal quality does not need to be expressed in terms of BER but may also be expressed by other quantities, for instance the frame error rate.

Further, advanced channel estimation as described herein may be extended to other OFDM and OFDM-MIMO systems with and without diversity.

Although specific embodiments have been illustrated and described herein, it will be appreciated by those of ordinary skill in the art that a variety of alternate and/or equivalent implementations may be substituted for the specific embodiments illustrated and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for operating a communication system including a channel estimation for OFDM systems in a receiver, comprising:
  receiving a signal being composed of multiple signal clusters received via different transmission links;
  providing information indicative of reception characteristics of the signal clusters; and performing an OFDM channel estimation of the received signal dependent on the information, wherein channel estimation comprises:
  accessing the information indicative of multiple signal cluster reception;
  obtaining one or more sets of filter coefficients depending on the information; and
  filtering received pilot symbols by an interpolation filter using the one or more sets of filter coefficients.

2. The method according to claim 1, wherein each signal cluster is composed of one or more signal components received from one specific transmitter.

3. The method of claim 1, wherein the information comprises the number of signal clusters.

4. The method of claim 1, wherein the information comprises information on a delay spacing between signal clusters.

5. The method of claim 1, wherein the information comprises information on a delay shift of a signal cluster.

6. The method of claim 1, wherein the information comprises information on a delay width of a signal cluster.

7. The method of claim 1, wherein the information comprises information on a Doppler spread between signal clusters.

8. The method of claim 1, wherein the information comprises information on a Doppler shift of a signal cluster.

9. The method of claim 1, wherein the information comprises information on a Doppler width of a signal cluster.

10. The method of claim 3, comprising associating each signal cluster with one specific transmitter and providing information on the number of signal clusters comprises:
  obtaining information on the actual position of the receiver which performs channel estimation;
  comparing the information on the position of the receiver with data indicative of the position of the transmitters; and
  determining the information on the number of signal clusters on the basis of the comparison result.

11. The method of claim 3, comprising associating each signal cluster with one specific transmitter and providing information on the number of signal clusters comprises:
  making a hypothesis on the number of signal clusters;
  performing channel estimation on the basis of the hypothesis; and
  assessing the signal quality of a signal equalized by using the channel estimation results in order to verify or abandon the hypothesis.

12. The method of claim 4, comprising associating each signal cluster with one specific transmitter and providing information on the delay spacing between signal clusters comprises:
  obtaining information on the actual position of the receiver which performs channel estimation;
  comparing the information on the position of the receiver with data indicative of the position of the at least two transmitters; and
  determining the information on the delay spacing on the basis of the comparison result.

13. The method of claim 4, wherein providing information on the delay spacing between signal clusters comprises:
  performing channel estimation on the basis of an assumed delay spacing;
  monitoring the signal quality of a signal equalized by using channel estimation results based on the assumed delay spacing;
  varying the assumed delay spacing whilst continuing to monitor the signal quality; and
  determining a delay spacing on the basis of the monitored signal quality.

14. The method of claim 7, wherein providing information on the Doppler spread between of at least two signal clusters comprises:
  obtaining information on the actual speed of the receiver which performs channel estimation; and
  determining the information on the Doppler spread on the basis of the information on the actual speed.

15. The method of claim 8, wherein each signal cluster is associated with one specific transmitter and providing information on the Doppler shift of the signal cluster comprises:
  obtaining information on the actual position and speed of the receiver which performs channel estimation;
  comparing the information on the position and speed of the receiver with data indicative of the position of the transmitter; and
  determining the information on the Doppler shift on the basis of the information on the actual position and speed of the receiver.

16. The method of claim 1, wherein obtaining one or more sets of filter coefficients comprises:
  selecting the one or more sets of filter coefficients from a plurality of pre-calculated sets of filter coefficients depending on the information.

17. The method of claim 1, wherein channel estimation comprises a channel estimation in frequency direction and a channel estimation in time direction.

18. The method of claim 1, wherein channel estimation comprises a channel estimation in frequency direction and a channel estimation in time direction,
  accomplishing the channel estimation in frequency direction in advance of the channel estimation in time direction; and
  the interpolation filter using the one or more sets of filter coefficients is employed for the channel estimation in frequency direction.

19. The method of claim 1, wherein channel estimation comprises a 2D channel estimation in the Doppler-delay plane.

20. A communication system having an OFDM receiver, comprising:
  a reception signal evaluation device configured to provide information indicative of reception characteristics of signal clusters received via different transmission links; and
  an OFDM channel estimator configured to perform channel estimation dependent on the information, wherein the channel estimator comprises an interpolation filter comprising one of two-dimensional interpolation filter and two one-dimensional filters.

21. A communication system having an OFDM receiver, comprising:
  a reception signal evaluation device configured to provide information indicative of reception characteristics of signal clusters received via different transmission links; and
  an OFDM channel estimator configured to perform channel estimation dependent on the information; and
  a calculation device calculating dependent on the information one or more sets of filter coefficients for use in an interpolation filter of the channel estimator.

22. The OFDM system receiver of claim 21, wherein the reception signal evaluation device comprises a determination circuitry for determining the number of signal clusters contributing to the reception signal.

23. The OFDM system receiver of claim 21, wherein the reception signal evaluation device comprises a determination circuitry for determining the delay spacing between signal clusters.

24. The OFDM system receiver of claim 21, wherein the reception signal evaluation device comprises a determination circuitry for determining a Doppler spread between signal clusters.

25. The OFDM system receiver of claim 21, wherein the reception signal evaluation device comprises a determination circuitry for determining a Doppler shift of a signal cluster.

26. The OFDM system receiver of claim 21, further comprising:
   a positioning system configured to determine the position of the receiver, wherein
   the reception signal evaluation device is configured to provide the information indicative of multiple transmitter signal reception characteristics on the basis of position data received from the positioning system.

27. The OFDM receiver of claim 21, wherein the calculation device comprises:
   a look-up table storing a plurality of sets of filter coefficients; and
   a selection circuitry configured to select one or more of the sets of filter coefficients from the plurality of sets of filter coefficients stored in the look-up table responsive to the information.

28. A communication system comprising:
   a reception signal evaluation device configured to provide information indicative of reception characteristics of a plurality of signal clusters received via different transmission links or paths, wherein the reception via different transmission links or paths causes the formation of the plurality of signal clusters in a Doppler-delay plane; and
   means for providing an OFDM channel estimator configured to perform channel estimation dependent on the information.

29. The communication system of claim 28, wherein the plurality of signal clusters are received from the same transmitted signal.

30. A communication system comprising:
   a reception signal evaluation device configured to provide information indicative of reception characteristics of a plurality of signal clusters received via different transmission links or paths, wherein the reception via different transmission links or paths causes the formation of the plurality of signal clusters in a Doppler-delay plane; and
   an OFDM channel estimator configured to perform channel estimation dependent on the information.

31. The communication system of claim 30, wherein the plurality of signal clusters are received from the same transmitted signal.

* * * * *